United States Patent

Woode

[11] Patent Number: 5,562,890
[45] Date of Patent: Oct. 8, 1996

[54] PRODUCTION OF ALKALI METAL CARBONATES

[75] Inventor: Richard D. A. Woode, Northwich, United Kingdom

[73] Assignee: Brunner Mond and Company Limited, Cheshire, United Kingdom

[21] Appl. No.: 244,360
[22] PCT Filed: Nov. 25, 1992
[86] PCT No.: PCT/GB92/02184
 § 371 Date: May 26, 1994
 § 102(e) Date: May 26, 1994
[87] PCT Pub. No.: WO93/11071
 PCT Pub. Date: Jun. 10, 1993

[30] Foreign Application Priority Data

Nov. 26, 1991 [GB] United Kingdom ............... 9125044

[51] Int. Cl.$^6$ ............................................. C01D 7/12
[52] U.S. Cl. ............................ 423/427; 210/683
[58] Field of Search ......................... 423/421, 427, 423/429; 210/683

[56] References Cited

U.S. PATENT DOCUMENTS 2,989,370 6/1961 Lee et al. ............................ 423/427

FOREIGN PATENT DOCUMENTS 47-41237 12/1969 Japan ................................. 423/427
785962 5/1980 South Africa.

OTHER PUBLICATIONS

Industrial And Engineering Chemistry, vol. 56, No. 1, Jan. 1964, Columbus pp. 35–39, Robert Kunin "Ion Exchange in Chemical Synthesis".
Chemical Abstracts, vol. 113, Nov. 1990, Columbus, OH, US, abstract No. 194332e, Zhenliang Zu et al. "Laboratory Study of the Production of Soda using Amines".
Sanji Nishimura et al. 'Proceedings of the International Solvent Extraction Conference,' 1981 see pp. 143–148, *Application of the Solvent Extraction to Inorganic Synthesis* (no month).
D. F. Othmer et al. 'Kirk–Othmer Encyclopedia of Chemical Technology, vol. 1' 1978, Wiley & Sons, New York, USA, see p. 869, paragraph 3 through 877, paragraph 1 (no month).

*Primary Examiner*—Michael Lewis
*Assistant Examiner*—Stuart L. Hendrickson
*Attorney, Agent, or Firm*—Woodard, Emhardt, Naughton, Moriarty & McNett

[57] ABSTRACT

A method of producing an alkali metal carbonate, e.g. sodium carbonate, comprises passing a solution or suspension of the alkali metal chloride and bicarbonate over an ion exchange resin which is chloride retaining and has a basicity greater than that of the bicarbonate ion. The product is an aqueous or suspension of the alkali metal carbonate. In the case where the alkali metal is sodium, the product may be used for brine purification in a conventionl Ammonia Soda process.

13 Claims, 1 Drawing Sheet

FIG.1

PRODUCTION OF ALKALI METAL CARBONATES

The present invention relates to the production of alkali metal carbonates, particularly but not exclusively, sodium carbonate.

Sodium carbonate also known as Soda Ash is obtained by 'synthetic' routes (i.e. the non-"Natural Ash" routes) and is also obtained from naturally occurring deposits of sodium sesquicarbonate.

Most of the current synthetic routes for obtaining sodium carbonate can be described by the following overall equation:

$$2NaCl + CaCO_3 \rightarrow Na_2CO_3 + CaCl_2$$

However the reaction cannot be achieved in a single stage and the most commonly used synthetic route (the Ammonia Soda process) uses the following series of reactions:

1. $CaCO_3 \xrightarrow{heat} CaO + CO_2 \uparrow$

2. $CaO + H_2O \longrightarrow Ca(OH)_2$

3. $2NaCl + 2CO_2 + 2NH_3 \longrightarrow 2NaHCO_3 \downarrow + 2NH_4Cl$

4. $2NaHCO_3 \xrightarrow{heat} Na_2CO_3 + CO_2 \uparrow + H_2O$

5. $2NH_4Cl + Ca(OH)_2 \xrightarrow{heat} CaCl_2 + 2NH_3 \uparrow + 2H_2O$

The ammonia, and half the carbon dioxide, are recycled within the process, so the overall reaction is as stated above.

The sodium chloride for reaction 3 is generally supplied to the process as a saturated or near saturated brine obtained by dissolving naturally occurring (solid) salt in water. The brine must be purified prior to use in the process to remove magnesium and calcium ions which would otherwise precipitate in the process as carbonate-containing compounds and cause blockage problems. The usual method of brine purification is to add sodium carbonate and sodium hydroxide to the brine so as to form precipitates of calcium carbonate and magnesium hydroxide which may then be removed. Obviously the sodium carbonate used for this process may be a portion of that produced in reaction 4.

The Ammonia Soda process does however suffer from a number of disadvantages. In particular, reactions 4 and 5 require considerable energy inputs (in the form of heat) to achieve the reactions desired, so the overall process is energy intensive in spite of very sophisticated efforts to recover and re-use heat energy within the process. The energy requirements of reactions 4 and 5 are a particular disadvantage when one considers that a portion of the energy is required directly or indirectly to produce that portion of the sodium carbonate which is not saleable, i.e. the portion used for brine purification. Further disadvantages of the Ammonia Soda process are that yield of sodium bicarbonate in reaction 3 does not generally exceed 80% and that the separation of this bicarbonate from the ammonium chloride also produced in reaction 3 is comparatively costly.

Attempts to overcome some or all of the abovementioned disadvantages have been made. For example, amines have been proposed as alternatives to ammonia as the carrier and have been investigated at great length. Soluble amines can give higher yields of insoluble sodium bicarbonate intermediate and lower energies of separation, but amine losses in use tend to be too costly. Long-chain insoluble amines potentially give even cheaper separation costs (e.g. gravity), but in practice the amine losses are still too costly due to emulsification problems and significant (albeit low) solubility of the amine in the effluent. Attempts to alleviate this problem using amine/organic solvent systems are being investigated widely, but again amine and solvent losses, and also solvent processing costs, are rather too high.

A further proposal is described in ZA-A-785962 (Klipfontein) in which a weak base (R—N) is carbonated to give R—NH$_2$CO$_3$ and then contacted with a sodium chloride solution (brine) so that sodium bicarbonate is obtained in accordance with the following equation $$R-NH_2CO_3 + NaCl \rightarrow R-NHCl + NaHCO_3$$

The sodium bicarbonate solution produced by this reaction is readily recovered from the resin (which may then be regenerated with milk of lime) so that the costly NaHCO$_3$/NH$_4$Cl separation associated with reaction 3 of the Ammonia Soda process is avoided.

A similar process is disclosed in an article by Robers Kunin entitled "Ion Exchange in Chemical Synthesis" (Industrial and Engineering Chemistry, Vol.56, No. 1, January 1964, pages 35–39). This article discloses a process which proceeds according to the overall equation $$R-N + CO_2 + MCl + H_2O \leftrightarrows R-NHCl + MHCO_3$$

where R—N is an ion exchange resin and M is an alkali metal.

It will be appreciated that, in this process as well as in shat described in ZA-A-785962, the resin is used as a direct replacement for the ammonia in the bicarbonation stage of the Ammonia Soda process (cf reaction 3 above). Both the process described by Kunin and that disclosed in ZA-A-785962 have the disadvantage that heat treatment of the sodium bicarbonate is still required for the production of sodium carbonate (c.f. reaction 4 above).

It is an object of the present invention to obviate or mitigate the abovementioned disadvantages.

According to the present invention there is provided a method of producing an alkali metal carbonate comprising passing a solution or suspension of the chloride and the bicarbonate of the alkali metal through a solid ion exchange resin which in the aqueous environment is chloride retaining and has a basicity greater than that of the bicarbonate ion, and recovering an aqueous solution or suspension of the alkali metal carbonate from the resin.

The method of the invention may be effected with the chloride and bicarbonate wholly in aqueous solution although it is possible to use an aqueous suspension of one or both of these compounds (particularly the bicarbonate). Similarly, the method may yield either a solution or suspension of the carbonate. For convenience, the term solution as used in the subsequent description in relation to the alkali metal chloride, bicarbonate or chloride is to be interpreted as covering a suspension thereof (except where the context otherwise requires).

Alkali metal carbonates may be represented by the formula M$_2$. x CO$_2$. If x=1 then the latter formula corresponds to pure M$_2$CO$_3$. However x may be less than or greater than 1. In the former case, (i.e. x<1) the carbonate is "basic" and in the latter case (i.e. x>1) the carbonate is "acidic". The present invention also covers the production of such acidic and basic carbonates and the term alkali metal carbonate is to be interpreted accordingly. For convenience therefore the formula M$_2$CO$_3$ as used hereinafter covers acidic and basic materials.

An alkali metal bicarbonate of formula MHCO3 has x=2. Thus the liquor fed to the resin will typically have an x value of up to 2. Most preferably the starting liquor will be such that x is from 1.8 to 2. The product obtained will have a lower x value usually in the range 0.8 to 1.9.

The invention is applicable particularly to the production of sodium carbonate (from sodium chloride and sodium bicarbonate) but is also applicable to the production of the carbonates of other alkali metals (e.g. potassium).

The method of the present invention relies on the use of a resin which, in the aqueous environment of the reaction, is capable of retaining chloride ions and has a basicity greater than that of the bicarbonate ion. As such, the reaction effected in the method of the invention may be represented by the following overall equation Resin+MCl+MHCO$_3$→Resin.HCl+M$_2$CO$_3$ (where M is an alkali metal).

It will be appreciated that the above equation is in contrast to the processes disclosed by Kunin and by Klipfontein (ZA-A-785962) in that the present invention uses bicarbonate as a starting material and recovers carbonate.

Whilst the above equation represents the overall reaction, it is not believed that the bicarbonate reacts directly with the resin. In fact the reactions at the resin appear to involve primarily hydrogen, hydroxyl and chloride ions.

In other words it would seem that in the relatively concentrated aqueous chloride environment in which the present process is operated, and at the relatively low concentrations of soluble carbonates/bicarbonates, the chloride form of the resin (and the free base forms) are preferred over the bicarbonated form. Whilst we do not wish to be bound by any particular mechanism for the reaction, it would seem that the basic resin increases the pH of liquor containing the bicarbonate species and that the following reaction takes place.

$HCO_3^- + OH^- \rightleftharpoons CO_3^{2-} + H_2O$

This reaction is driven to the right by the hydroxyl ions generated by the resin. Accordingly the hydroxyl ions continue to be released until such time as the resin becomes exhausted.

Since the ion exchange resin will be a polymeric, solid and insoluble material, the solution of the alkali metal carbonate is readily recoverable from the resin without any significant energy requirement. Additionally, since the resin may be separated easily from the product, virtually all of the alkali metal chloride may be converted to the product. Moreover, the reaction may be effected at ambient temperature thus avoiding the use of heat for the conversion of bicarbonate to carbonate (C.f. reaction 4 above).

Preferably the ion exchange resin is a weak base anion exchange resin, most preferably one in which the basicity is provided by amino groups which may be primary and/or secondary and/or tertiary amino groups. Most preferably the resin is a cross-linked acrylic resin. The preferred resins for use in the invention are therefore cross-linked acrylic resins provided with primary, secondary and/or tertiary amino groups. It is preferred that the resin does not include quaternary ammonium groups to any substantial extent.

The resin will obviously become 'spent' with continued use and it is obviously desirable that the resin be periodically regenerated. For preference, the resin is one which is capable of being regenerated by hydroxide ions and therefore the preferred resins have a basicity between that of the bicarbonate ion and the hydroxide ions. For convenience the hydroxide ions may be provided by a 'milk of lime' suspension. If the resin is to be regenerated by a 'milk of lime' suspension then the resin should be one which during the reaction to produce the alkali metal carbonate does not retain sulphate ions (which may be present in the alkali metal chloride and bicarbonate liquors) to any great extent since these ions would give rise to insoluble calcium sulphate deposits during regeneration. The abovementioned cross-linked acrylic resins carrying primary, secondary and/or tertiary amino groups meet these requirements.

During regeneration procedure different osmotic conditions will generally prevail in the resin as compared to when the resin is being used to produce carbonate. The resin should therefore be robust to osmotic cycling such as would occur during alternating carbonate formation and resin regeneration steps.

A resin suitable for use in the present invention is the weak base acrylic anion exchange resin available under the name Purolite A-835. This resin is recommended for the use in the demineralisation of water containing organic matter and we have found that, at the relatively high ionic strengths at which the method of the present invention will normally be operated, this resin will effect the required conversion of bicarbonate to carbonate whilst preferentially retaining chloride ions.

Other resins which are useful include Purolite A845, Dianon WA10, Amberlite IRA67, and Amberlite IRA68.

The alkali metal bicarbonate used as starting material for the method of the invention may conventionally be obtained by reacting a portion of the sodium carbonate solution produced with $CO_2$ to 'regenerate' a bicarbonate solution which may then be passed over the resin with further alkali metal chloride solution to generate the carbonate. The $CO_2$ may be obtained by calcination of calcium carbonate in which case the CaO produced may be used in producing a 'milk of lime' suspension for resin regeneration. It is therefore possible to envisage an overall process (as applied to the production of sodium carbonate) operating in accordance with the following equations, in which the solid resin is considered to have tertiary amino groups ($R_3N$).

a. $CaCO_3 \xrightarrow{heat} CaO + CO_2$ b. $CaO + H_2O \longrightarrow Ca(OH)_2$ c. $2R_3N + 2NaHCO_3 + 2NaCl \longrightarrow 2R_3N.HCl + 2Na_2CO_3$ d. $Na_2CO_3 + CO_2 + H_2O \longrightarrow 2NaHCO_3$ e. $2R_3N.HCl + Ca(OH)_2 \longrightarrow 2R_3N + CaCl_2 + 2H_2O$ In the above scheme, only a portion of the $Na_2CO_3$ produced in reaction (c) is passed to reaction (d) for "regeneration" of $NaHCO_3$.

The method of invention as used for the production of a sodium carbonate solution may conveniently be operated in conjunction with a conventional Ammonia Soda process to provide a brine purification reagent (i.e. the sodium carbonate solution) therefor. Such a sodium carbonate solution does not require purification to remove chloride ions and/or sulphate ions before being used for brine purification. The sodium carbonate solution may also be used for brine purification in other applications. For example, it can be used to purify brine which is used to produce solid salt, or brine which is used to produce chlorine and caustic soda.

The method may however also be applied to the production of solid sodium carbonate. For example, the sodium carbonate solution produced may be evaporated to dryness. As a further alternative, the sodium carbonate solution may of course be treated with carbon dioxide to precipitate sodium bicarbonate which is then heated to yield sodium carbonate. This is not necessarily the preferred route for producing solid sodium carbonate but in some special circumstances could be the most ecomonic method. In any event, the carbonation of the sodium carbonate solution is a method whereby sodium bicarbonate solid and sodium sesquicarbonate solid could be manufactured, and these are marketable products in their own right. Alternatively, the sodium carbonate may be cooled to precipitate out sodium-carbonate, as one or more of its hydrates, separated and further dehydrated as desired.

BRIEF DESCRIPTION OF THE DRAWING

The invention will be further described by way of example only with reference to the accompanying drawings which schematically illustrate the method of the invention as applied to the production of a brine purification reagent for a conventional Ammonia Soda process.

Figure 1:
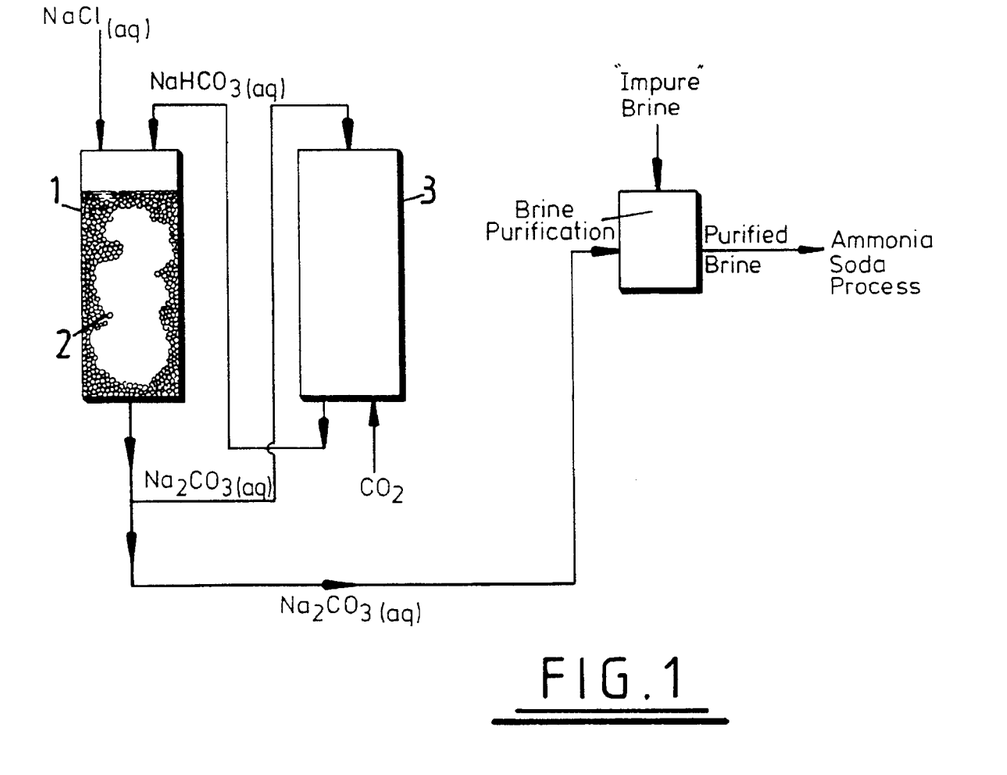

Referring to the drawing, a column 1 packed with a chloride retaining ion-exchange resin 2 is fed with a saturated or near saturated solution of sodium chloride and a solution or suspension of sodium bicarbonate (as produced in carbonator 3—see below). The resin 2 has a basicity greater than that of the bicarbonate ion but less than that of a calcium hydroxide suspension ("milk of lime"). The resin 2 may for example be Purolite A-835. Within the column 1, the resin 2 effects a conversion of the sodium chloride and sodium bicarbonate to sodium carbonate (by the mechanism discussed above) so that eluate from the column is a sodium carbonate solution, possibly also containing chloride and/or sulphate ions.

A portion of the eluate is fed to the top of carbonator 3 into the base of which is supplied carbon dioxide so that within the carbonator 3 sodium carbonate is converted to sodium bicarbonate which is returned to column 1 as shown. The proportion of the eluate from column 1 which is passed to tower 3 depends on the percentage conversion (in column 1) of sodium chloride and sodium bicarbonate to sodium carbonate. With 100% conversion to carbonate in column 1 (and assuming 100% conversion to bicarbonate in carbonator 3) half of the sodium carbonate produced in column 1 will be passed to carbonator 3. For lower conversion in column 1, the amount of carbonate passed to carbonator 3 will be correspondingly greater.

That portion of the eluate which is not passed to carbonator 3 is passed to the brine purification stage of a conventional Ammonia Soda process. The purified brine may then be processed by the Ammonia Soda process to produce sodium carbonate.

It will be appreciated that the resin in column 1 will eventually become spent. Regeneration of the resin is conveniently effected by passing a milk of lime suspension over the resin to produce a calcium chloride effluent. Conveniently the milk of lime suspension is obtained by calcining calcium carbonate to give carbon dioxide (which is fed to carbonator 3) and lime (CaO) which is slaked to produce the milk of lime. Obviously the calcination products may be obtained from the calcination step employed in the Ammonia Soda process.

EXAMPLE 1

2782.6 g of the gel-type weakly basic acrylic resin, PUROLITE A845, was packed into a 76 mm diameter column under water. As received the resin consisted of particles approximately 0.4–1.5 mm in size. The resin was in the free-base form.

The resin in the column was washed with 9 liters of purified brine, under ambient conditions, by introducing the brine to the top of the column and allowing it to fall through the column by gravity. At the end of the brine wash the solution leaving the column had a composition 5.265N in chloride ion, and 0.032N in alkali. This was equivalent to a solution containing 308 g/liter sodium chloride and 1.696 g/liter sodium carbonate.

A solution, of temperature 30° C., and containing sodium chloride and sodium bicarbonate, plus a small amount of sodium carbonate, was then introduced continuously to the top of the column at a rate of 0.3–0.4 liters/minute. The composition of the solution was: −303.9 g/liter sodium chloride (chloride=5.195N), 6.17 g/liter sodium oxide (alkali=0.199N), and 7.72 g/liter carbon dioxide; the ratio of equivalents of $CO_2/Na_2O$ was 1.76. The pH of the liquor was 7.45. The solution leaving the column was collected and analysed as follows:

| Liquor Volume | pH | Alkali Normality | Chloride Normality | $CO_2$ g/l | $CO_2/Na_2O$ Equivalents Ratio | ∴ New Alkali Generated (as g · NaOH) |
|---|---|---|---|---|---|---|
| 1 | 10.00 | 0.302 | 5.06 | 6.53 | 0.98 | 4.17 |
| 1 | 10.05 | 0.356 | 5.13 | 7.56 | 0.97 | 6.14 |
| 1 | 10.13 | 0.366 | 5.09 | 7.58 | 0.94 | 6.59 |
| 1 | 10.15 | 0.366 | 5.13 | 7.68 | 0.95 | 6.53 |
| 1 | 10.15 | 0.364 | 5.12 | 7.59 | 0.95 | 6.47 |
| 1 | 10.15 | 0.366 | 5.13 | 7.93 | 0.98 | 6.53 |
| 1 | 10.14 | 0.366 | 5.13 | 7.82 | 0.97 | 6.53 |
| 1 | 10.12 | 0.366 | 5.12 | 7.84 | 0.97 | 6.54 |
| 1 | 9.98 | 0.364 | 5.12 | 7.81 | 0.98 | 6.47 |
| 1 | 9.91 | 0.364 | 5.11 | 7.59 | 0.95 | 6.48 |
| 1 | 9.88 | 0.364 | 5.12 | 7.56 | 0.94 | 6.47 |
| 10 | 9.05 | 0.348 | 5.14 | 7.59 | 0.99 | 58.21 |
| 13.1 | 8.12 | 0.272 | 5.155 | 7.63 | 1.28 | 37.61 |
| 10.25 | 7.81 | 0.224 | 5.195 | 7.78 | 1.58 | 9.87 |
| 17.45 | 7.72 | 0.208 | 5.185 | 7.67 | 1.68 | 6.31 |
| 15.85 | 7.50 | 0.200 | 5.195 | 7.55 | 1.72 | 0.61 |
| | | | | | TOTAL | 181.53 |

In the first column of the above Table, the "Liquor Volume" is the size (in liters) taken from the column for analysis purposes. The "New Alkali Generated" (first column of the Table) was calculated allowing for possible dilution effects on the column using the following formula $$\text{New Alkali Generated} = \left( AN_2 - \left( AN_1 \times \frac{CN_2 + AN_2}{CN_1 + AN_1} \right) \right) \times 40$$

where $AN_1$ is the alkali normality of the solution entering the column.

$CN_1$ is the chloride normality of the solution entering the column.

$AN_2$ is the alkali normality of the solution leaving the column $CN_2$ is the chloride normality of the solution leaving the column.

The number 40 included in the above equation is, of course, the gram equivalent weight of sodium hydroxide.

The term in the inner set of brackets in the above equation effectively provides a recalculated valve of the starting normality based on the sodium mass balance to take account of the change in concentration caused by the resin "abstracting" water from the solution.

The values of $AN_1$ and $AN_2$ are obtained by titration of the inlet and outlet solutions respectively with hydrochloric acid.

The term "New Alkali Generated" represents the amount of NaOH which is the product effectively generated at the resin when the latter is converted to the hydrochloride form. The generated hydroxide ions react immediately with any bocarbonate present, and the value of "New Alkali Generated" provides a measure of the effectiveness of the resin for converting bicarbonate to carbonate.

The resin was calculated to have converted sodium chloride in the brine to an equivalent of 6.52 g NaOH per 100 g resin (in the "as-received" condition).

The column was then washed with a further 9 liters of purified brine in a manner similar to the first wash. At the end of this wash the solution leaving the Column had a composition 5.32N in chloride ion, and 0.022N in alkali.

The column was then washed with 8 liters of demineralised water by introducing the water to the top of the column and allowing it to drain by gravity. At the end of the wash the solution leaving the column was less than 0.001N in both chloride and alkali.

The ion exchange resin in the column was fluidised by recycling water from the top to the bottom of the column at a rate of approximately 0.5 liter/min. 1.15 liters of a suspension of calcium hydroxide (approximately 4N in concentration, i.e. 150 g Ca(OH)$_2$/liter), was introduced to this recyle and circulated through the resin bed for 30 minutes.

The solution was then drained from the column and analysed. Demineralised water was then introduced to the column, recirculated for a few minutes and drained. The column was washed twice more with demineralised water. The washings were analysed as follows:

| Liquor Volume | pH | Alkali Normality | Chloride Normality | NaOH Equivalent of Chloride (gms) |
|---|---|---|---|---|
| 9.15 | 11.19 | 0.051 | 0.3835 | 140.4 |
| 8.05 | 9.92 | <0.001 | 0.095 | 30.6 |
| 20.00 | 9.79 | <0.001 | 0.008 | 6.4 |
| 40.00 | 7.87 | <0.001 | 0.005 | 8.0 |
| | | | TOTAL | 185.4 g |

Therefore, the resin was regenerated fully by this treatment. In fact 102% regeneration was calculated, which may mean that extra sites were activated compared with the previous regeneration.

EXAMPLE 2

The procedure used was similar to that in Example 1 (using the same resin column), except that slightly different liquor volumes were used to ensure resin enhaustion, and brine and water wash volumes were raised slightly to ensure thorough washing.

The solution to be treated was 5.29N in chloride, 0.176N in alkali, 6.9 g/liter $CO_2$, had an equivalents ratio of $CO_2/Na_2O$=1.78, and the pH was 7.35. The solution was fed to the column at a rate of 0.5–0.6 liters/minute.

The first few liters of liquor leaving the column were 5.18N in chloride, 0.334N in alkali, and had an equivalents ratio of $CO_2/Na_2O$=0.94. The column exhaustion was equivalent to a capacity of 6.84 g NaOH/100 g resin. The resin was regenerated with a calcium hydroxide suspension.

This Example demonstrates that the process can be repeated on the same resin.

EXAMPLE 3

The procedure used was similar to that in Example 2, with the following exceptions.

The ion exchange resin was the gel-type weakly basic acrylic resin, Dianon WA10; weight 1740 gins as received.

The solution to be treated was 5.26N in chloride, 0.198N in alkali, 7.74 g/liter $CO_2$, had an equivalents ratio of $CO_2/Na_2O$=1.78, and the pH was 7.11. The solution was fed to the column at rates from 0.22 to 0.67 liters/minute.

The first few liters of liquor leaving the column were 5.1N chloride, 0.40N in alkali, and had an equivalents ratio of $CO_2/NaO$=0.95. The column exhaustion was equivalent to a capacity of 8.41 g NaOH/100 g resin.

The resin was regenerated by first introducing calcium chloride to the column so that the liquor recirculating was 2.29N in chloride. 0.9 liters of the calcium hydroxide suspension was then introduced to the recirculating stream to yield a final solution 2.35N in chloride and having a total alkalinity (soluble and insoluble) of 0.032N. From the volumes involved it was calculated that 95% of the resin had been regenerated.

Therefore this Example demonstrates that the resin can be regenerated in strong calcium chloride solutions. Thus effluent volumes do not need to be unacceptably large.

EXAMPLE 4

The procedure used was similar to that given in Example 2 with the following exceptions.

The ion exchange resin was the macroporous weakly basic acrylic type resin, Purolite A835: the weight as received was 2090 gms.

The solution to be treated was 5.16N in chloride, 0.182N in alkali, 7.68 g/liters $CO_2$, had an equivalents ratio $CO_2/Na_2O=1.92$, and a pH=7.33. The solution was fed to the column at rates varying from 0.6–3.0 liters/minute.

The first few liters of liquor leaving the column were 5.07N in chloride, 0.31N in alkali, and had an equivalents ratio $CO_2/Na_2O=0.99$. At column exhaustion the equivalent of 110.1 g NaOH had been produced, which is 5.27 g NaOH/100 g resin.

For the regeneration stage 0.73 liters of a calcium hydroxide suspension of 4N was used (i.e. 150 g/liters). The analysis of the effluents and washings were as follows:

| Volume Litres | pH | Chloride Normality | Alkali Normality | NaOH Equivalent Regenerated | Total Present |
|---|---|---|---|---|---|
| 9.5 | 11.3 | 0.261 | 0.018 | 99.2 | 106.0 |
| 0.15 | 11.35 | 0.055 | 0.010 | 0.3 | 0.4 |
| 2.0 | 10.68 | 0.056 | 0.006 | 4.5 | 5.0 |
| 8.0 | 10.5 | 0.009 | 0.002 | 2.9 | 3.5 |
| 16.0 | 10.35 | 0.002 | <0.001 | 1.3 | 1.3 |
| | | | TOTAL | 108.2 | 116.2 |

From the results the resin regeneration was 98.3% of the capacity.

Of the calcium hydroxide present:

92.6% was used to regenerate the resin.

6.8% was present in the calcium chloride effluent.

0.6% was unaccounted for (possibly lost as carbonate).

The above figures demonstrate that very little (if any) carbonate is carried forward to the regeneration stage.

EXAMPLE 5

The procedure was similar to that given in Example 2 except that:

The ion exchange resin used was the gel-type weakly basic acrylic resin, Amberlite IRA68: the weight as received was 3328 gins.

The solution to be treated was 5.18N in chloride, 0.184N in alkali, 7.64 g/liter $CO_2$, had an equivalents ratio $CO_2/Na_2O=1.89$, and pH=7.02. It also contained 3.70 g/liter sulphate, expressed as The solution was fed to the column at about 1 liter/minute.

As with other resins the first few liters had an equivalent ratio $CO_2/Na_2O)=0.98$. The 9th liter was 5.08N in chloride, 0.334N in alkali, had an equivalents ratio $CO_2/Na_2O=1.08$, and contained 3.71 g/liter $SO_4=$. The column exhaustion was equivalent to 7.49 g NaOH/100 g resin.

This illustrates that the sulphate remains in the brine phase and does not pass to the regeneration stage.

EXAMPLE 6

The procedure was similar to that given in Example 2, except that:

The ion exchange resin used was the macroporous weakly basic acrylic resin, Purolite A830: the weight as received was 2085 gms.

The solution to be treated was 5.18N in chloride, 0.154N in alkali, 6.38 g/l in $CO_2$, had an equivalents ratio $CO_2/Na_2O=1.88$, and the pH was 6.78. The solution was fed to the column at rates of 0.5–2.0 liters/minute.

The first few liters of product from the column were 5.08N in chloride, 0.285N in alkali, and had an equivalents ratio $CO_2/Na_2O=0.93$. The column exhaustion was equivalent to 4.93 g NaOH/100 g resin.

EXAMPLE 7

The procedure was similar to that given in Example 2, except that:

The ion exchange resin used was the gel-type weakly basic acrylic resin, Amberlite IRA67: the weight as received was 3000 gms.

The solution to be treated was 5.21N in chloride, 0.18N in alkali, 6.28 g/liter $CO_2$, had an equivalents ratio $CO_2/Na_2O=1.59$, and a pH=7.9. The solution was fed to the column at a rate of about 0.6 liters/minute.

The first few liters of product from the column were 5.07N in chloride, 0.302N in alkali, and had an equivalents ratio $CO_2/Na_2O=0.94$. The column exhaustion was equivalent to 8.52 g NaOH/100 g resin.

EXAMPLE 8

This Example illustrates the preliminary evaluation technique used to determine which resins were useful in the process. Results are given for various weakly basic acrylic resins.

Ion exchange resin, varying in amount between 100 g and 200 g as received in a moist state, was weighed accurately and then pretreated with a 5% sodium hydroxide solution, to ensure that the resin was in the free base form, and then washed thoroughly with demineralised water. The resin was drained free of surface water and washed with at least 2 mils of purified per gramme of resin to displace the water from the resin. The resin was then mixed with about 9 mls of brine per g resin and treated with carbon dioxide gas at ambient conditions, whilst agitating the mixture, for up to 90 minutes. The solution was drained from the resin and analysed.

The resin was washed with more brine to displace the reactants, and then washed with water to remove the brine until the chloride in the washings was reduced to negligible levels. The resin was then stirred with excess quantities of a calcium hydroxide suspension for up to 90 minutes. The suspension was filtered, and the filtrate analysed for chloride to determine the quantitiy of chloride ion recovered from the resin.

A number of weakly basic acrylic resins were tested with the following results:

| Resin Type | | Dianon WA10 | Amberlite IRA68 | Amberlite IRA68 | Amberlite IRA67 | Purolite A830 | Purolite A835 |
|---|---|---|---|---|---|---|---|
| Purfied Brine | Chloride - Nomality | 5.21 | 5.30 | 5.16 | 5.22 | 5.30 | 5.32 |
| | Alkali - | 0.02 | 0.02 | 0.03 | — | 0.02 | 0.03 |

-continued

| Resin Type | | Dianon WA10 | Amberlite IRA68 | Amberlite IRA68 | Amberlite IRA67 | Purolite A830 | Purolite A835 |
|---|---|---|---|---|---|---|---|
| Product Solution | Normality $SO_4=$ - g/litre | 3.71 | 3.77 | 3.74 | 3.74 | 3.75 | 3.70 |
| | Chloride - Normality | 5.15 | 5.04 | 5.12 | — | 5.30 | 5.20 |
| | Alkali - Normality | 0.226 | 0.20 | 0.24 | — | 0.170 | 0.20 |
| | $CO_2$ - g/litre | 7.92 | 8.44 | 9.08 | — | 5.19 | 7.51 |
| | Equiv $CO_2$/ $Na_2O$ ratio | 1.59 | 1.92 | 1.72 | — | 1.39 | 1.71 |
| | $SO_4=$ - g/litre | 3.72 | 3.71 | 3.76 | 3.76 | 3.77 | 3.77 |
| | ∴ g NaOH/ 100 g resin | 8.01 | 7.20 | 8.40 | — | 5.83 | 6.70 |
| Regeneration with $Ca(OH)_2$ | Chloride Normality | 0.253 | — | — | — | — | — |
| | $SO_4=$ - g/litre | — | — | — | 0.16 | — | — |
| | ∴ Equiv g NaOH regenerated 100 g resin | 8.16 | — | — | — | — | — |

The Example demonstrates the effectiveness of the forward reaction, the effectiveness of regeneration with milk of lime (for one resin) and the fate of the sulphate in the brine.

The experimental procedure was carried out as in Example 8. A number of weakly basic styrene-divinylbenzene copolymer ion exchange resins were used, with the following results:

| Resin Type | | Lewatit MP62 | Dowex 66 | Purolite A107 | Amberlite IRA94 | Amberlite 93SP | Amberlyst A21 |
|---|---|---|---|---|---|---|---|
| Purfied Brine | Chloride - Normality | 5.28 | 5.28 | 5.38 | 5.35 | 5.33 | 5.32 |
| | Alkali - Normality | <0.001 | <0.001 | <0.001 | <0.001 | <0.001 | <0.001 |
| Alkali Regenerated during Brine wash g NaOH/100 g resin | | 0.12 | 0.86 | 0.24 | — | 0.61 | 0.45 |
| Product Brine | Chloride - Normality | 5.28 | 5.28 | 5.38 | 5.03 | 5.19 | 5.27 |
| | Alkali - Normality | 0.02 | 0.008 | 0.012 | 0.03 | 0.01 | 0.04 |
| | $CO_2$ - g/litre | — | 0.22 | 0.35 | — | 0.41 | 1.20 |
| | Equiv $CO_2$/ $Na_2O$ ratio | — | 1.25 | 1.33 | — | 1.86 | 1.36 |
| | ∴ g NaOH/ 100 g resin | 0.80 | 0.32 | 0.48 | 1.69 | 0.37 | 1.68 |
| TOTAL | g NaOH/100 g resin | 0.92 | 1.18 | 0.72 | 1.69 | 0.98 | 2.13 |
| Regeneration with $Ca(OH)_2$ | Chloride - Normality | 0.063 | 0.027 | — | 0.148 | — | 0.081 |
| | ∴ Equiv NaOH regenerated/ 100 g resin | 0.92 | 0.75 | — | 1.86 | — | 1.65 |

Although this Example is not in accordance with the invention, it does represent an initial sorting test to identify resins which in may be useful in the process of the invention. If a resin will not work in the relatively low pH conditions which existed in the tests (e.g. pH 7–9) then it will not be suitable for use in the invention.

EXAMPLE 9

This Example illustrates the evaluation technique using weakly basic styrene-based ion exchange resins.

The resins are shown to be too weakly basic and only a small proportion of the potential ion exchange capacity is usable. It also shows that some of the so-called weakly basic resins have a proportion of strong base present, and this normally cannot be regenerated using milk of lime.

EXAMPLE 10

This Example illustrates the preliminary evaluation technique using strongly basic styrene-based ion exchange resins.

About 300 gms of strongly basic ion exchange resin, weighed moist as received after converting to its OH⁻ form, was stirred with 0.3 liters of purified brine under ambient conditions. Samples of solution were analysed every 10 minutes until a constant result was obtained. This was usually within two or three samples. The resin was then filtered and washed thoroughly with water to remove the chlorides present. The resin was then reslurried in 0.35 liters of approximately 2.5N calcium hydroxide suspension (93.75 g/l), and stirred under ambient conditions. Again samples were taken every 10 minutes until the analysis of the samples was constant. If the regeneration was shown to be incomplete, more calcium hydroxide suspension was added, and the stirring and sampling repeated. Some extra regeneration was usually achieved this way.

mls/mixture, under ambient conditions, with a solution containing 262.4 g KCl per liter (3.52N in chloride), and 39.24 g per liter potassium bicarbonate (0.392N in alkali). The solution leaving the column was analysed every 200 mls, with the following results:

| Resin Type | | Dowex SBR | Amberlite IRA400 | Dowex 2 | Amberlyst A26 | Amberlite IRA910 | Amberlite IRA410 | Dowex 21K | Amberlite IRA458 |
|---|---|---|---|---|---|---|---|---|---|
| Starting | Chloride, N | 5.26 | 5.22 | 5.22 | 5.22 | 5.22 | 5.22 | 5.22 | 5.22 |
| Brine | Alkali, N | 0.025 | <0.001 | <0.001 | <0.001 | <0.001 | <0.001 | <0.001 | <0.001 |
| Product | Chloride, N | 2.32 | 2.62 | 3.36 | 2.50 | 2.96 | 3.40 | 2.76 | 3.02 |
| Brine | Alkali, N | 1.32 | 1.175 | 0.57 | 0.83 | 0.67 | 0.865 | 1.08 | 1.01 |
| | g NaOH/100 g resin | 7.57 | 6.00 | 3.78 | 4.69 | 3.58 | 4.08 | 4.76 | 4.02 |
| Regeneration 1 | Chloride, N Total | 0.063 | 0.054 | 0.192 | 0.039 | 0.160 | 0.156 | 0.059 | 0.076 |
| | Alkali, N | 2.20 | 2.33 | 1.86 | 2.36 | 1.72 | 2.10 | 2.48 | 2.32 |
| | ∴ Equiv g NaOH/100 g resin | 0.98 | 0.25 | 1.60 | 0.17 | 0.80 | 0.95 | 0.22 | 0.29 |
| Regeneration 2 | Chloride, N Total | 0.046 | 0.036 | 0.109 | 0.037 | 0.128 | 0.087 | 0.044 | 0.047 |
| | Alkali, N | 2.10 | 2.35 | 2.21 | 2.18 | 2.08 | 2.40 | 2.68 | 2.60 |
| | ∴ Equiv g NaOH/100 g resin | 1.51 | 0.44 | 1.91 | 0.45 | 1.09 | 1.20 | 0.46 | 0.48 |

EXAMPLE 11

200 g of the weakly basic resin PUROLITE A845, weighed in the as-received form, was packed into a column 25 mm in diameter. The resin was prewashed with excess solution containing 5% sodium o hydroxide to ensure that it was converted to the free base form. The resin was then rinsed with 400 mls of solution containing 294.5 g KCl per liter (3.95N in Cl⁻). The column was then fed at a rate of 20

| Sample Number | Alkalinity Normality | Chloride Normality | $CO_2$ g/litre | ∴ $CO_2/K_2O$ Equivs | g KOH produced by resin |
|---|---|---|---|---|---|
| 1 | 0.620 | 3.41 | 13.6 | 1.00 | 2.42 |
| 2 | 0.610 | 3.46 | 16.0 | 1.19 | 2.26 |
| 3 | 0.580 | 3.41 | 16.8 | 1.32 | 2.02 |
| 4 | 0.565 | 3.42 | 16.7 | 1.34 | 1.86 |
| 5 | 0.520 | 3.47 | 16.2 | 1.42 | 1.35 |
| 6 | 0.500 | 3.44 | 16.8 | 1.53 | 1.18 |
| 7 | 0.475 | 3.46 | 17.2 | 1.65 | 0.90 |
| 8 | 0.455 | 3.46 | 17.4 | 1.74 | 0.70 |
| 9 | 0.440 | 3.47 | 17.1 | 1.77 | 0.54 |
| 10 | 0.425 | 3.48 | 16.8 | 1.80 | 0.38 |
| 11 | 0.415 | 3.50 | 17.7 | 1.94 | 0.28 |
| 12 | 0.410 | 3.51 | 17.9 | 1.98 | 0.19 |
| 13 | 0.405 | 3.52 | 17.7 | 1.99 | 0.13 |
| 14 | 0.400 | 3.52 | 17.5 | 1.99 | 0.08 |
| 15 | 0.400 | 3.53 | 17.5 | 1.99 | 0.07 |
| | | | | Total KOH made = | 14.36 g |

Total KOH made/100 g resin = 7.18 g

EXAMPLE 12

A similar procedure to that used in Example 11 was followed, except that the bicarbonated feed solution to the column had the following composition: 246 g KCl per liter (3.30N in Cl⁻), 48.04 g $K_2O$ per liter (1.02N in alkali), and 40.50 g Carbon Dioxide per liter; the ratio of equivalents of $CO_2/K_2O$ was equal to 1.80. The solution leaving the column was analysed every 100 mls as follows:

| Sample No | Alkalinity Normality | Chloride Normality | $CO_2$ g/litre | ∴ $CO_2/K_2O$ Equivs | g KOH produced by resin |
|---|---|---|---|---|---|
| 1 | 1.18 | 3.22 | 27.3 | 1.05 | 0.79 |
| 2 | 1.36 | 3.18 | 33.3 | 1.11 | 1.61 |
| 3 | 1.26 | 3.21 | 33.8 | 1.22 | 1.15 |
| 4 | 1.16 | 3.25 | 38.0 | 1.49 | 0.67 |
| 5 | 1.16 | 3.25 | 39.7 | 1.56 | 0.67 |
| 6 | 1.18 | 3.20 | 45.3 | 1.74 | 0.82 |
| 7 | 1.26 | 3.19 | 43.1 | 1.55 | 1.17 |
| 8 | 1.20 | 3.22 | 44.4 | 1.68 | 0.88 |
| 9 | 1.24 | 3.18 | 39.6 | 1.45 | 1.10 |
| | | | | Total KOH made = | 8.86 g |

Total KOH made/100 g resin=4.43 g, but resin had not yet got to the point of exhaustion.

I claim:

1. A method of producing an alkali metal carbonate comprising passing an aqueous solution or suspension of the chloride and the bicarbonate of the alkali metal through a solid ion exchange resin that in the aqueous environment is chloride retaining and has a basicity greater than that of the bicarbinate ion but less than that of a milk of lime suspension, and recovering an aqueous solution or suspension of the alkali metal carbonate from the resin.

2. A method as claimed in claim 1 wherein the resin is cross-linked acrylic resin.

3. A method as claimed in claim 1 wherein the basicity of the resin is provided by primary and/or secondary and/or tertiary amino groups.

4. A method as claimed in claim 1 further comprising the step of regenerating the resin with hydroxide ions.

5. A method as claimed in claim 4 wherein the hydroxide ions are provided by a milk of lime suspension.

6. A method as claimed in claim 1 and further comprising recycling a portion of the alkali metal carbonate solution or suspension by reacting said portion with carbon dioxide to produce alkali metal bicarbonate for use in said passing step.

7. A method as claimed in claim 1 wherein the resin does not retain sulphate ions.

8. A method as claimed in claim 1 wherein the alkali metal is sodium.

9. A method of producing sodium carbonate comprising the steps of (i) heating calcium carbonate to generate CaO and $CO_2$, (ii) treating the CaO from step (i) with water to generate a milk of lime suspension, and (iii) passing an aqueous solution or suspension of sodium chloride and sodium bicarbonate through a solid ion exchange resing that in the aqueous environment is chloride retaining and has a basicity greater than that of the bicarbonate ion but less than that of milk of lime suspension, and recovering an aqueous solution or suspension of the sodium carbonate from the resin, the process further comprising the steps of (iv) treating a portion of the sodium carbonate solution or suspension with $CO_2$ from step (i) to produce sodium bicarbonate which is then passed to step (iii), and (v) periodically regenerating the resin with the milk of lime suspension obtained from step (ii).

10. A method of purifying brine comprising providing a sodium carbonate solution or suspension by passing an aqueous solution or suspension of sodium chloride and sodium bicarbonate through a solid ion exchange resin that in the aqueous environment is chloride retaining and has a basicity greater than that of the bicarbonate ion but less than that of milk of lime suspension, and recovering an aqueous solution of suspension of sodium carbonate from the resin, and contacting the recovered sodium carbonate with brine to purify the brine.

11. The method of claim 10 and further comprising utilizing the purified brine from said contacting step in the Ammonia Soda process.

12. The method of claim 1 wherein the ion exchange resin of said providing step is a weak-base anion exchange resin.

13. The method of claim 9 wherein the ion exchange resin of said providing step is a weak-base anion exchange resin.

* * * * *

UNITED STATES PATENT AND TRADEMARK OFFICE
CERTIFICATE OF CORRECTION

PATENT NO. : 5,562,890                                        Page 1 of 3
DATED      : October 8, 1996
INVENTOR(S) : Richard Derek Anthony Woode It is certified that error appears in the above-indentified patent and that said Letters Patent is hereby corrected as shown below:

In column 2, line 20, please delete "Robers" and insert in lieu thereof --Robert--.

In column 2, line 30, please delete "shat" and insert in lieu thereof --that--.

In column 2, line 59, please delete "$M_2$" and insert in lieu thereof --$M_2O$--.

In column 3, line 1, please delete "MHCO3" and insert in lieu thereof --$MHCO_3$--.

In column 3, line 52, please delete "C.f." and insert in lieu thereof --c.f.--.

In column 7, line 17, please insert a period after "column".

In column 8, line 29, please delete "gins" and insert in lieu thereof --gms--.

In column 8, line 46, please delete "NaO" and insert in lieu thereof --$Na_2O$--.

UNITED STATES PATENT AND TRADEMARK OFFICE
CERTIFICATE OF CORRECTION

PATENT NO. : 5,562,890  
DATED : October 8, 1996  
INVENTOR(S) : Richard Derek Anthony Woode Page 2 of 3

It is certified that error appears in the above-indentified patent and that said Letters Patent is hereby corrected as shown below:

In column 9, line 2, please delete "liters" and insert in lieu thereof --liter--.

In column 9, line 11, please delete "liters" and insert in lieu thereof --liter--.

In column 9, line 42, please delete "gins" and insert in lieu thereof --gms--.

In column 9, line 46, after "as" please insert $--SO_4^=.--$

In column 10, line 45, after "purified" please insert --brine--.

In column 11, line 59, please delete "in", first occurrence.

In column 13, line 64, please delete "O".

UNITED STATES PATENT AND TRADEMARK OFFICE
CERTIFICATE OF CORRECTION

PATENT NO. : 5,562,890
DATED : October 8, 1996
INVENTOR(S) : Richard Derek Anthony Woode It is certified that error appears in the above-indentified patent and that said Letters Patent is hereby corrected as shown below:

In column 15, line 28, please delete "bicarbinate" and insert in lieu thereof --bicarbonate--.

In column 15, line 32, please insert --a-- before "cross".

In column 16, line 23, please delete "resing" and insert in lieu thereof --resin--.

In column 16, line 25, please insert --a-- before "milk".

Signed and Sealed this

Twenty-ninth Day of April, 1997

BRUCE LEHMAN

Attest:

Attesting Officer

Commissioner of Patents and Trademarks